(12) United States Patent
Klement et al.

(10) Patent No.: US 10,062,183 B2
(45) Date of Patent: Aug. 28, 2018

(54) CONTENT ADAPTIVE DISPLAY FOR EMISSIVE DISPLAYS

(71) Applicant: Motorola Mobility LLC, Chicago, IL (US)

(72) Inventors: Alexander Klement, West Dundee, IL (US); Kevin Dao, Skokie, IL (US); Ye Yang, Prior Lake, MN (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/279,208

(22) Filed: Sep. 28, 2016

(65) Prior Publication Data

US 2018/0089861 A1 Mar. 29, 2018

(51) Int. Cl.
*G06T 11/00* (2006.01)
*G09G 3/20* (2006.01)
*G09G 3/3208* (2016.01)

(52) U.S. Cl.
CPC .......... *G06T 11/001* (2013.01); *G09G 3/2003* (2013.01); *G09G 3/2007* (2013.01); *G09G 3/3208* (2013.01); *G09G 2300/0452* (2013.01); *G09G 2320/0666* (2013.01); *G09G 2320/08* (2013.01); *G09G 2320/103* (2013.01)

(58) Field of Classification Search
CPC .. G06T 11/001; G09G 3/2003; G09G 3/3208; G09G 2320/0666
See application file for complete search history.

(56) References Cited

U.S. PATENT DOCUMENTS

| | | | |
|---|---|---|---|
| 9,343,040 B2 * | 5/2016 | Miller | G09G 3/2003 |
| 9,426,329 B2 * | 8/2016 | Wang | H04N 1/4074 |
| 9,685,126 B2 * | 6/2017 | Lim | G09G 3/3611 |
| 9,934,595 B2 * | 4/2018 | Safaee-Rad | G06T 11/001 |
| 2009/0046089 A1 | 2/2009 | Zhuang et al. | |
| 2010/0315449 A1 * | 12/2010 | Chaji | G09G 3/3208 345/690 |

* cited by examiner

*Primary Examiner* — Antonio A Caschera
(74) *Attorney, Agent, or Firm* — Kunzler, PC (57) ABSTRACT

For adjusting color values in image data for an emissive display, a method receives a frame of image data and adjusts a color value of a first color component by predetermined amount and identifies a white point from the adjusted color value of the first color component for each pixel in the frame of image data. The method remaps, for each pixel in the frame of image data, color values for a second color component and for a third color component based on the white point and controls the emissive display to present the frame of image data using the adjusted color value and the remapped color values. Each pixel of the emissive display includes a first subpixel that emits the first color component, a second subpixel that emits the second color component, and a third subpixel that emits the third color component.

20 Claims, 8 Drawing Sheets

CONTENT ADAPTIVE DISPLAY FOR EMISSIVE DISPLAYS

FIELD

The subject matter disclosed herein relates to electronic display technology and more particularly relates to adjusting color values in image data for an emissive display.

BACKGROUND

Description of the Related Art

Organic light-emitting diode ("OLED") displays of becoming mainstream and portable devices, such as laptop computers, tablet computers, mobile phones, and the like. OLED displays offer better optical formants compared to liquid crystal display ("LCD") panels. However, OLED displays suffer from higher power consumption than LCD panels.

BRIEF SUMMARY

An apparatus for adjusting color values in image data for an emissive display is disclosed. A method and program product also perform the functions of the apparatus.

The apparatus includes an emissive display comprising a plurality of pixels, each pixel of the emissive display comprising a first subpixel that emits a first color component, a second subpixel that emits a second color component, and a third subpixel that emits a third color component. The apparatus also includes a processor and a memory that stores code executable by the processor. The processor adjusts, uniformly over a frame of image data, a color value of the first color component by a predetermined amount. The processor identifies a white point from the adjusted color value of the first color component for each pixel in the frame of image data. The processor re-maps, for each pixel in the frame of image data, color values for the second color component and for the third component based on the white point. The processor then controls the emissive display to present the frame of image data using the adjusted color value and the remapped color values.

In some embodiments, each pixel emissive display further includes a fourth subpixel that emits a fourth color component. In such embodiments, remapping color values includes the processor calculating, for each pixel of the frame of image data, a revised color value for the second color component based on the white point, a revised color value for the third color component based on the white point, and a revised color value for the fourth color component. The revised color values for each pixel may be calculated independently of color values of other pixels in the frame of image data.

In certain embodiments, the processor receives an image adaptation trigger for remapping an image. In such embodiments, the processor adjusts the color value of the first color component in response to receiving the image adaptation trigger. The image adaptation trigger may be one or more of: the apparatus running on battery power, a battery level dropping below a threshold amount, user selection of the power mode, and an on-pixel-ratio exceeding a predetermined threshold.

In one embodiment, the processor controls the emissive display to present the primitive image data without reducing a display brightness level. In certain embodiments, the processor determines whether the frame of image data includes a dynamic image or static image. In such embodiments, adjusting the color value of the first color component may include adjusting the color value of the first color component by a first amount for a dynamic image and buy a second amount for a static image, the first amount being greater than the second amount.

In one embodiment, the first color component is a blue color component and adjusting the color value of the first color component by a predetermined amount includes reducing a blue value by the predetermined amount. In such embodiments, the second and third color components may be red and green components, respectively, wherein remapping color values for the second and third color components based on the white point includes increasing a red value based on the white point and increasing a green value based on the white point.

In another embodiment, the first color component is a green color component and adjusting the color value the first color component by a predetermined amount includes increasing a green value by the predetermined amount. In such embodiments, the second and third color components may be red and blue color components, respectively, wherein remapping color values for the second and third color components based on the white point includes increasing a red value based on the white point and decreasing a blue value based on the white point.

A method for adjusting color values image data for an emissive display may include receiving, at a processor, a frame of image data. The method also includes adjusting a color value of a first color component by predetermined amount and identifying a white point from the adjusted color value of the first color component for each pixel in the frame of image data. The method further includes remapping, for each pixel in the frame of image data, color values for a second color component and a third color component based on the white point. The method includes controlling the emissive display to present the frame of image data using the adjusted color value and the remapped color values.

In some embodiments, remapping color values includes cackling, for each pixel of the frame of image data, a revised color value for the second color component based on the white point and calculating, for each pixel of the frame of image data, a revised color value for the third color component based on the white point. In such embodiments, the revised color values for each pixel are calculated independently of color values of other pixels in the frame of image data.

In certain embodiments, the first color component is blue component and adjusting a color value of the first color component by a predetermined amount includes reducing a grayscale value of the blue component of each pixel in the frame by the predetermined amount. In other body mints, the first color component is a green component and adjusting a color value of the first color component by a predetermined amount includes increasing a grayscale value of the green component of each pixel in the frame by the predetermined amount.

In some embodiments, the method includes receiving an image adaptation trigger for remapping an image. In such embodiments, adjusting the color value of the first color component occurs in response to the image adaptation trigger. The image adaptation trigger may be selected from: detecting that a device containing the display is running on battery power, detecting user selection of a power mode, and detecting that an on-pixel-ratio exceeds a predetermined threshold.

In certain embodiments, controlling display to present the frame of image data using the adjusted color value and the remapped color values includes controlling the emissive display to present the frame of image data without reducing a display brightness level. In some embodiments, the method includes determining whether the frame of image data includes a dynamic image or a static image. In such embodiments, adjusting the color value of the first color component includes adjusting the color value of the first color component by a first amount for a dynamic image and buy a second amount for a static image, the first amount being greater than the second amount.

The program product for adjusting color values in image data for an emissive display 110 includes a computer readable storage medium that stores code executable by processor, the executable code including code to perform: receiving a frame of image data and adjusting, uniformly over the frame of image data, a color value of a first color component by predetermined amount. The program product further includes code to perform: identifying a white point from the adjusted color value of the first color component for each pixel in the frame of image data and remapping, for each pixel in the frame of image data, color values for a second color component and a third color component taste on the white point. The program product further includes code to perform: controlling a display to present the frame of image data using the adjusted color value and the remapped color values, the display including a plurality of pixels with each pixel of the display containing a first subpixel that emits the first color component, a second subpixel that emits the second color component, and a third subpixel that emits the third color component.

In certain embodiments, the first color component is a blue component, the second color component is a red component, and the third color component is a green component. In such embodiments, adjusting the color value of the first color component by a predetermined amount includes reducing a blue value by the predetermined amount. Additionally, remapping color values for the second come or component based on the white point includes increasing a red value based on the white point and remapping color values for the third color component based on the white point includes increasing a green value based on the white point.

In other embodiments, the first color component is a green component, the second color component is a red component, and the third color component is a blue component. In such embodiments, adjusting the color value of the first color component by a predetermined amount includes increasing a green value by the predetermined amount. Additionally, remapping color values for the second come or component based on the white point includes increasing a red value based on the white point and remapping color values for the third color component based on the white point includes reducing a blue value based on the white point.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The disclosed embodiments provide systems, apparatuses, methods, and program products for adjusting color values in image data for an emissive display. Certain emissive displays, such as OLED displays, use different materials for each subpixel color. Each material emits light at a different wavelength. The combination of subpixels forms a pixel capable of displaying a wide range of colors. Each material has a different power efficiency. For a three-color, red-blue-green ("RGB") scheme, green is the most efficient material and blue is the least efficient material.

In order to achieve power savings while optimizing image quality, the disclosed embodiments adjust the color value for first color, and by predetermined amount. In some embodiments, the first color component corresponds to a most efficient emission material. In other embodiments, the first color component corresponds to a least efficient emission material. The first color value is adjusted uniformly over a frame of image data by the predetermined amount.

Adjusting the first color value affects the image quality. To compensate, the remaining color values are likewise adjusted to keep the white point for the pixel as close to the white point specification as possible. This adjustment involves identifying a white point from the adjusted first color component and remapping color values for the remaining color component. As used herein, "as close to the white point specification as possible" refers to being within a threshold range of the white point specification, for example, within a certain percentage. As used herein, the "white point specification" refers to a range of white point color values, rather than a single point on the color spectrum. For example, different white point color values may be labeled with different color "temperatures," where the white point specification encompasses a range of color temperatures.

Where the first color component corresponds to the least efficient emission material, the first color component is reduced uniformly over the frame of image data. Consequently, the remaining color component may be increased, maintained, or reduced in order to remap the remaining color components based on the white point. Where the first color component corresponds to the most efficient emission material, the first color component is increased uniformly over the frame of image data. As before, the remaining color components are remapped based on the white point. In certain situations, reducing the color contribution the least efficient emission material may result in greater power savings compared to increasing the color contribution of the most efficient emission material.

Certain OLED displays have an automatic current limit ("ACL") function which dims the display (e.g., reduces the brightness levels of the OLED display) in order to reduce power consumption. However, this feature negatively affects user experience. The LCD displays have a content adaptive brightness control ("CABC") function which adjusts image data and simultaneously reduces backlight brightness levels to minimize quality impact while providing power savings. However, this function is unavailable with emissive displays, such as OLED displays, because the separate pixels of an emissive display produce (emit) light, while in LCD technology the pixels filter light generated by the backlight. The present disclosure provides a technique for achieving similar results in emissive displays as CABC, albeit by different means due to the differences in display technology.

Figure 1:
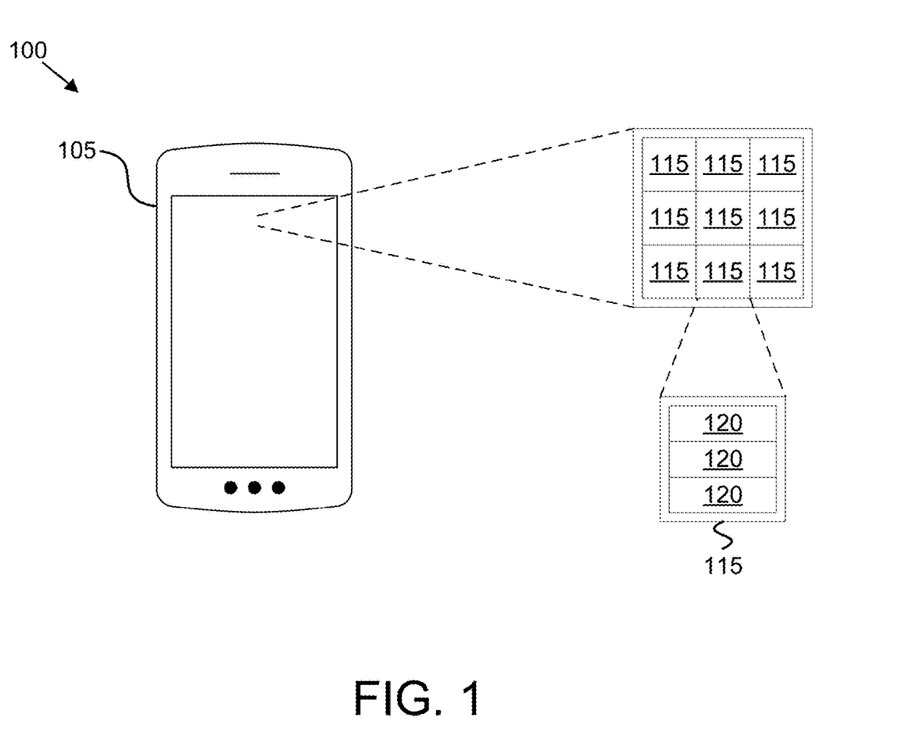
FIG. 1 is a drawing illustrating one embodiment of a system for adjusting color values in image data for an emissive display.

FIG. 1 is a schematic block diagram illustrating one embodiment of a system 100 for adjusting color values in image data for an emissive display, according to embodiments of the disclosure. In the depicted embodiment, the system 100 includes an electronic device 105 having an emissive display 110. Examples of electronic devices 105 include, but are not limited to, a mobile telephone, a tablet computer, laptop computer, a camera, a portable gaming system, a portable entertainment system, or other device having an emissive display. The electronic device 105 controls the emissive display 110 to present image data thereon. In certain embodiments, the electronic device 105 adjusts color values in image data for the emissive display 110 in response to entering a particular mode, such as a power saving mode. The particular mode may be a default setting of the electronic device 105. In other embodiments, the electronic device 105 automatically adjusts color values in image data based on a type of content displayed, such as static images, video data, photographs, text-heavy images, and the like.

The emissive display 110, in one embodiment, may include any known electronically controllable emissive display device. In certain embodiments, the emissive display 110 may include a wearable display such as a smart watch, smart glasses, a heads-up display, or the like. The emissive display 110 includes a plurality of pixels 115. Each pixel 115 in the emissive display 110 emits light at a particular wavelength (or additive combination of wavelengths) to display a piece of image data. As shown, each pixel 115 includes a plurality of subpixels 120, each subpixel 120 corresponding to a color component.

In the depicted embodiment, each pixel 115 contains three subpixels 120, each subpixel 120 corresponding to a separate color component. However, the disclosed embodiments are not to be limited to the specific amounts and types of subpixels 120, displayed. In other embodiments, each pixel 115 may include more than three subpixels 120 so as to emit more than three color components. Still further, a pixel 115 may include multiple subpixels 120 emitting the same color component. Yet further, a pixel 115 may include one or more subpixels 120 that emits white light, rather than an individual color component.

The emissive display 110 also includes a display driver 125 controls the pixels 115 to display a frame of image data. The image data comprises a plurality of data pixels organized into a frame, each data pixel comprises a value to be displayed by a corresponding pixel 115 in the emissive display 110. The display driver 125 may be an integrated circuit. In certain embodiments, the display driver 125 may include a hardware controller and driver software operating on the controller hardware to display the frame of image data.

Figure 2:
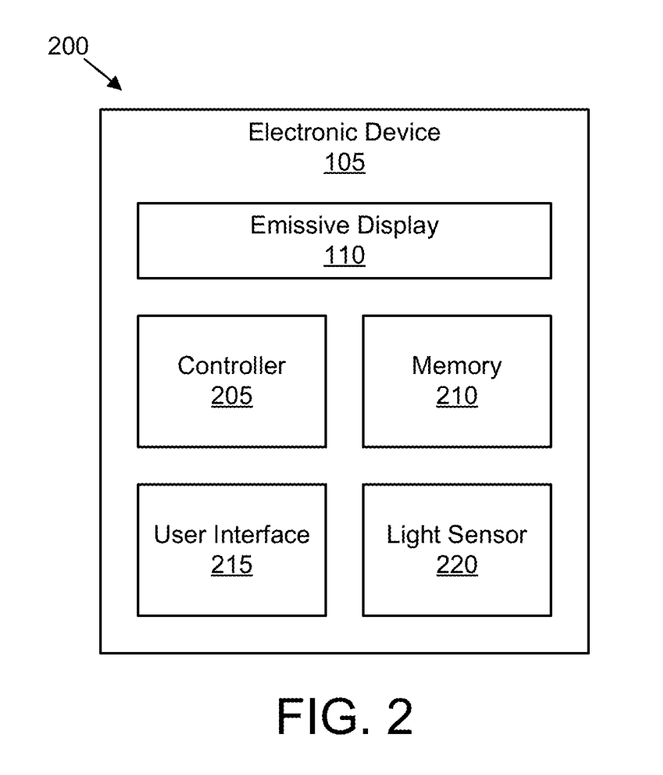
FIG. 2 is a schematic block diagram illustrating one embodiment of an apparatus for adjusting color values in image data for an emissive display.

FIG. 2 is a schematic block diagram of an apparatus 200 for adjusting color values in image data for an emissive display 110, according to embodiments of the disclosure. The apparatus 200 may be one embodiment of the electronic device 105 having an emissive display 110, as discussed above with reference to FIG. 1. In addition, the electronic device 105 includes a controller 205, a memory 210, and a user interface 215. In certain embodiments, the electronic device 105 may also include a light sensor 220.

The controller 205, in one embodiment, may include any known controller capable of executing computer-readable instructions and/or capable of performing logical operations. For example, the controller 205 may be a microcontroller, a microprocessor, a central processing unit ("CPU"), a graphics processing unit ("GPU"), an auxiliary processing unit, a field programmable gate array ("FPGA"), or similar programmable controller. In certain embodiments, the controller 205 is a display driver coupled to the emissive display 110. In some embodiments, the controller 205 executes instructions stored in the memory 210 to perform the methods and routines described herein. The controller 205 is communicatively coupled to the memory 210, the user interface 215, the emissive display 110, and the light sensor 220.

The controller 205 adjusts color value of a first color component by a predetermined amount. The processor adjusts the color value of the first color component uniformly over frame of image data. That is to say, for each pixel in the frame of image data, the controller 205 adjusts (e.g., increases or, alternatively, reduces) the color value by the predetermined amount. The predetermined amount they be expressed as a percentage, by a number of grayscale values (also referred to as "gray levels") by a color-specific brightness level, and the like. For example, if the first color component is blue, the predetermined amount is 10 gray levels, and a first pixel in the frame of image data has an 8-bit RGB pixel value of [97, 119, 171], then the controller 205 reduces the blue color component (e.g., 171) by 10 gray levels to 161.

The predetermined amount is based on an acceptable amount of image manipulation. The acceptable amount of image manipulation may be an empirically-derived, quantitative measurement. Additionally, the predetermined amount may be based on one or more factors, such as a content type, user preference, ambient light, and the like. Content type refers to the nature of the content described by the image data. The content may be text, images (static), photographs, video, and the like. Dynamic images, such as video, may permit a greater adjustment than static images. Accordingly, the controller 205 may just the color value of the first color component by one amount for dynamic image, but by a different (lesser) amount for a static image.

In certain circumstances, the predetermined amount exceeds a permissible adjustment range for certain pixel. For example, the predetermined amount may be 10 gray levels but the RGB pixel value has a blue color component value that is less than 9 (assuming 0 is the lowest value), so that the blue color component cannot be reduced by the full 10 gray levels. As another example, the predetermined amount may be 8 gray levels but the RGB pixel value has a green color component value greater than 247 (assuming 255 is the highest possible value), so that the green color component cannot be increased by the full 8 gray levels. In such circumstances, the controller 205 may adjust the color component by a maximum permitted amount (e.g., reducing the blue to 0 or increasing the green to 255). In other circumstances, the controller 205 may adjust the color component by less than the predetermined amount, such as by half the predetermined amount. In certain embodiments, the predetermined amount may be a graduated amount which decreases toward the ends of the range of color values (e.g., near 0 and 255 for an 8-bit pixel value).

After adjusting the color value for the first color component throughout the frame of image data, the controller 205 identifies a white point from the adjusted color value of the first color component. The controller 205 identifies the white point for each pixel in the frame of image data on a pixel-by-pixel basis. As discussed above, the white point refers to a range of white values (e.g., temperature values), rather than a single point. Thus, because of the adjustment to the first color component, the white point shifts in the controller 205 identifies a new white point for each pixel.

After identifying the white point, the controller 205 remaps, for each pixel in the frame of image data, the color values for all other color components. Thus, where the emissive display 110 uses three color components, the controller 205 first adjusts the first color component, then later remaps the second color component and third color component. Where the emissive display 110 uses four color components, the controller 205 first adjusts the first color component, then remaps the second color component, the third color component, and the fourth color component.

The controller 205 calculates the color values for each pixel in the frame of image data independently of color values of other pixels in the frame of image data. Accordingly, not all pixels have the second color component adjusted by the same amount. Similarly, not all pixels have the third color component adjusted by the same amount. Rather, each data pixel is adjusted individually based on the new white point caused due to adjusting the first color component by the predetermined amount. In certain embodiments, the controller 205 limits adjustment of the color values for the second color component, third color component, etc. to a maximum remapping amount. In certain embodiments, the maximum remapping amount is the same as the predetermined amount. Thus, in the above examples where the predetermined amount was 10 grayscale levels, a maximum remapping amount may also be 10 grayscale levels. However, in other embodiments the maximum remapping amount is based on user preference, on the acceptable amount of image manipulation, or the like.

Generally, the first color component is either corresponds to the most efficient emission material or the least efficient emission material. For OLED displays, the most efficient material produces a green subpixel and the least efficient emission material produces a blue subpixel. In one embodiment, the controller 205 reduces a blue color component by a predetermined amount and remap the red and green color components based on the new white point, wherein the remapping increases both the color value of the red color component and the color value of the green color component. Alternatively, the controller 205 may increase a green color component by a predetermined amount and remap the red and blue color components based on the new white point, by increasing the red color component value and decreasing the blue color component value. The predetermined amount by which a blue pixel is reduced may differ from the predetermined amount by which a green pixel is increased. The controller 205 may select between reducing the blue color component and increasing the green color component based on default settings, user preference, user selection, content type, a selected level of image quality, a selected level of power savings, and the like. Generally, reducing the blue color component by the predetermined amount results in a greater power savings than increasing the green color component the predetermined amount.

Having remapped the color values, the controller 205 controls the emissive display 110 to present the frame of image data using the adjusted color value of the first color component and the remapped color values for the remaining color components. Accordingly, the emissive display 110 presents the modified frame of image data. Controlling the emissive display 110 to present the frame of image data using the adjusted color value of the first color component and the remapped color values for the remaining color components does not involve reducing the display brightness level (e.g., the overall perceived brightness level of the emissive display). Beneficially, power consumption by the emissive display 110 is reduced due to the adjusted/remapped color values without resorting to reducing the display brightness level. Further, image qualities preserved by identifying new white point and remapping the color values based on the new white point.

In some embodiments, the controller 205 initiates the disclosed image adaptation (e.g., remapping) in response to receiving an image adaptation trigger. The image adaptation trigger may be detecting that the electronic device 105 is running on battery power, detecting that the electronic device 105 is in a certain power mode (e.g., in response to user selection), or determining that an on-pixel-ratio ("OPR") exceeds a predetermined threshold. Upon receipt of the image adaptation trigger, the controller 205 adjusts the color value of the first color component by the predetermined amount, identifies a new white point, and remaps color values for the remaining color components, as discussed herein.

The on-pixel-ratio ("OPR") refers to a ratio of color value (e.g., grayscale level) for each pixel in the image data. For each pixel, the OPR for a particular color component is calculated by dividing the grayscale value of that color component by the maximum grayscale value (e.g., 255 for an 8-bit pixel), resulting in percentage (referred to as the "on-percentage"). The average on-percentage for the color component over all the pixels in the image data is calculated to reach the OPR. Thus, the OPR for blue is the average on-percentage for all blue subpixels, the OPR for green is the average on-percentage for all green subpixels, and the OPR for red is the average on-percentage for already subpixels. The OPR for white, in RGB, is the sum of the OPR for red, the OPR for green, and the OPR for blue, divided by three. More generally, the OPR for white is a some of the OPRs for the individual color components, divided by the number of color components.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to adjusting color values in image data for an emissive display, such as a color value lookup table, a gamma curve, and the like. In some embodiments, the memory 210 also stores program code and related data, such as an operating system or other controller algorithms operating on the electronic device 105.

The user interface 215, in one embodiment, may include any known computer input device including a touch panel, a button, a keyboard, a stylus, a microphone, or the like. In some embodiments, the user interface 215 may be integrated with the emissive display 110, for example, as a touchscreen or similar touch-sensitive display. In some embodiments, the user interface 215 includes a touchscreen such that text may be input using a virtual keyboard displayed on the touchscreen and/or by handwriting on the touchscreen. In some embodiments, the user interface 215 includes two or more different devices, such as a keyboard and a touch panel.

In certain embodiments, the user interface 215 is capable of outputting audible and/or haptic signals. For example, the user interface 215 may include one or more speakers for producing an audible alert or notification (e.g., a beep or chime) or other sound. In some embodiments, the user interface 215 includes one or more haptic devices for producing vibrations, motion, or other haptic feedback. In some embodiments, all or portions of the user interface 215 may be integrated with the emissive display 110. For example, the user interface 215 and emissive display 110 may form a touchscreen or similar touch-sensitive display. In other embodiments, the user interface 215 may be located near the emissive display 110.

The light sensor 220, in one embodiment, includes circuitry for detecting an ambient light condition at the electronic device 105. The controller 205 may measure the ambient light condition and adjust the emissive display 110 based on the amount of ambient light. The amount of ambient light may affect a user's perceptions such that an acceptable image quality varies based on the amount of ambient light. In certain embodiments, the predetermined amount by which the processor uniformly adjusts the color value of the first color component is based on the amount of ambient light. In other embodiments, the white point used for remapping the remaining color component may be selected based on the amount of ambient light. Additionally, the controller 205 may adjust a brightness level of the emissive display 110 based on the amount of ambient light.

Figure 3A:
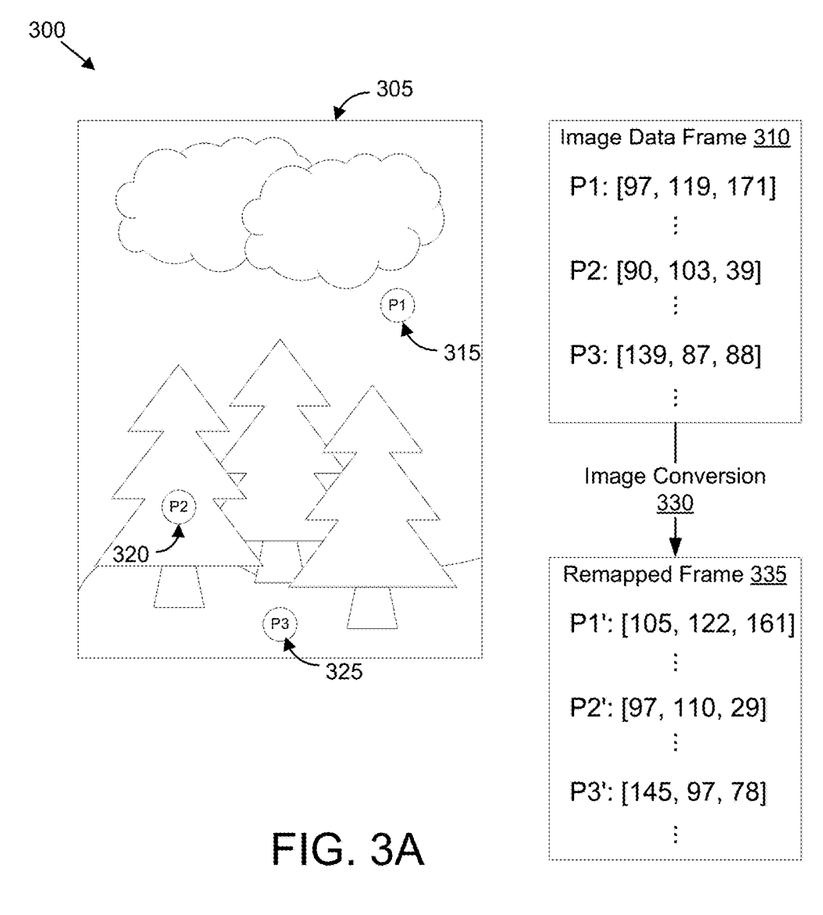
FIG. 3A is a schematic block diagram illustrating one example of image adaptation.
Figure 3B:
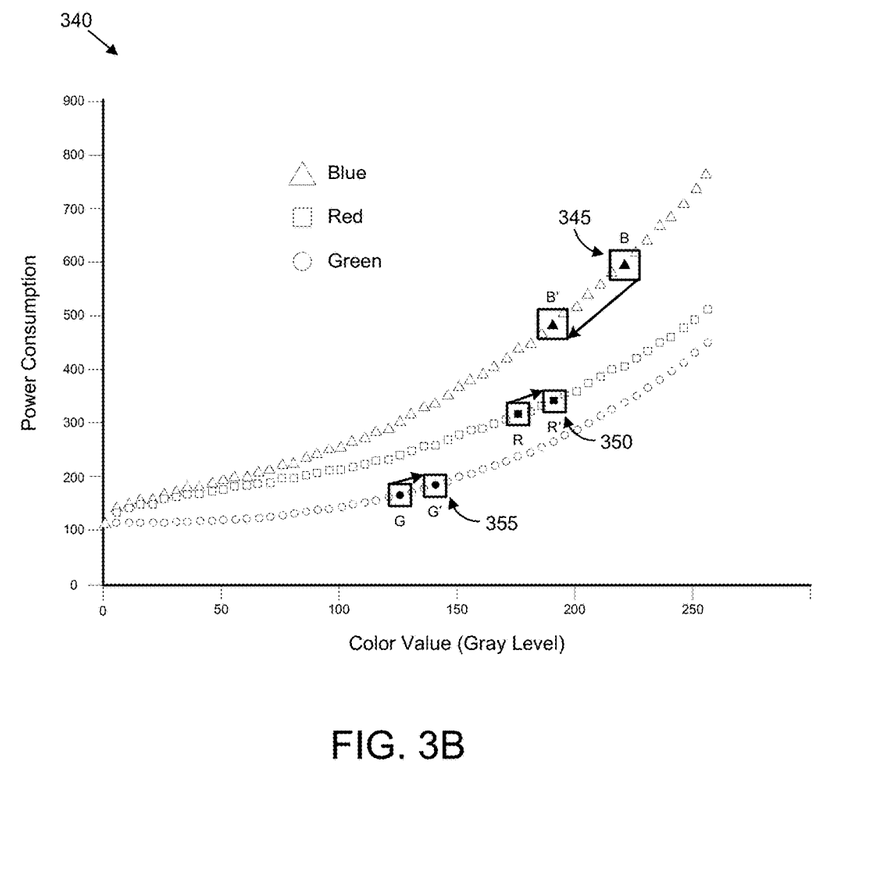
FIG. 3B is a chart diagram illustrating one embodiment of a power consumption graph for different color values and power savings achieved by image adaptation.
Figure 3C:
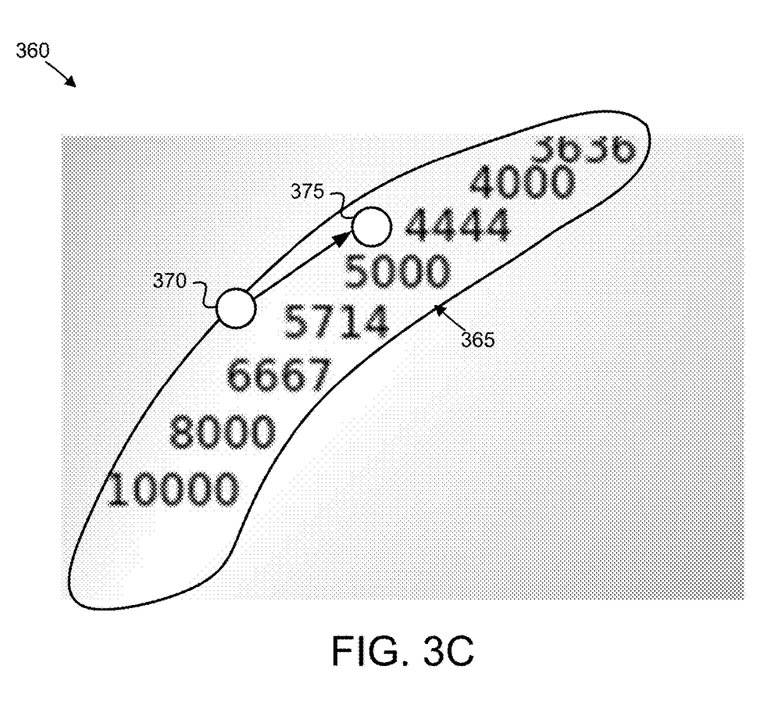
FIG. 3C is a chart diagram illustrating one embodiment of white point color temperatures.

FIGS. 3A-3C depict a first example of image adaptation according to the disclosed embodiments. FIG. 3A depicts a first image adaptation procedure 300 for an image 305. Here, the image 305 depicts a landscape scene. The image 305 corresponds to an image data frame 310. The image 305 and the image data frame 310 image comprise a plurality of pixels, including a first pixel 315, a second pixel 320, and a third pixel 325. Here, the pixels 315-325 from various parts of the image 305 and each corresponds to a different color.

As depicted in the image data frame 310, the first pixel 315 has an RGB color value of [97, 119, 171], the second pixel 320 has an RGB color value of [90, 103, 39], and the third pixel 325 has an RGB color value of [139, 87, 88]. The first image adaptation procedure 300 includes converting 330 the image 305 by reducing the blue color component by a predetermined amount, here by 10 gray levels. Each pixel in the image data frame 310 has its blue color component reduced by the same amount (10 gray levels).

Converting 330 the image data frame 310 also includes identifying a new (adjusted) white point value and remapping the red color component, on a pixel-by-pixel basis, by an amount determined by the new white point value and remapping the green color component, on a pixel-by-pixel basis, by an amount determined by the new white point value. As depicted, the amount by which the red color component is adjusted differs from the amount by which the green color component is adjusted. Further, the amount by which the red color component is adjusted varies among the depicted pixels 315-325 in the image data frame 310.

Converting 330 the image data frame 310 produces a remapped frame 335. The remapped frame 335 comprises image data corresponding to an adaptation of the image 305. Here, the first pixel 315 is modified to a new RGB color value of [105, 122, 161]. The second pixel 320 is modified to a new RGB color value of [97, 110, 161]. The third pixel 325 is modified to a new RGB color value of [145, 97, 78]. Note here that the green color component of the third pixel 325 is increased by a maximum adjustment level equal to the predetermined amount by which the blue color component is reduced (e.g., 10 gray levels). In other embodiments, the maximum adjustment level may differ from the predetermined amount by which the blue color component is reduced.

FIG. 3B depicts a chart 340 of power consumption versus color value for blue subpixels, red subpixels, and green subpixels. As depicted, the blue subpixels consume more power at a given color value than either the red subpixels or the green subpixels, and the green subpixels consume less power at a given color value than either the red subpixels or the blue subpixels. The power savings of the first image adaptation procedure 300 is demonstrated using the chart 340. Here, a blue subpixel 345 is first reduced by predetermined amount, then a red subpixel 350 and a green subpixel 355 are increased by an amount determined by the adjusted white point, as discussed above. Note that the decrease in power consumption by the blue subpixel 345 is greater than the sum of the increase in power consumption by the red subpixel 350 and the increase in power consumption by the green subpixel 355, therefore resulting in overall power savings compared to the original pixel. As this procedure repeats for each pixel in the image data frame 310, power savings achieved throughout the remapped frame 335.

In certain embodiments, a given pixel of the image data frame 310 only undergoes image conversion 330 if a power savings will be realized by the transformation. For example, chart 340 shows that a larger amount of overall power savings can be realized by reducing color values of blue subpixels at the right side of the chart 340 than by reducing color values of blue subpixels at the left side of the chart 340. Accordingly, a decrease in blue color value may not result in power savings over the corresponding increase in red and green color values where the original blue color value is less than a threshold amount. A controller, such as the controller 205, may compare a blue color value for a pixel in the image data frame 310 and only adapt that pixel if the blue color values above the threshold amount. Otherwise, the remapped frame 335 may include the original RGB color value for the pixel.

FIG. 3C depicts a color spectrum 360 having a color temperature range 365 corresponding to a plurality of white points. Where a pixel corresponding to a first white point 370 is adjusted by the predetermined amount (e.g., the blue color component value reduced by the predetermined amount), the white point shifts to the second white point 375 due to the reduced blue color component. A controller, such as the controller 205, may identify the second white point 375 based on the reduced blue color component and calculate an amount by which a red color component value is to be increased and an amount by which a green color component is to be increased.

Figure 4A:
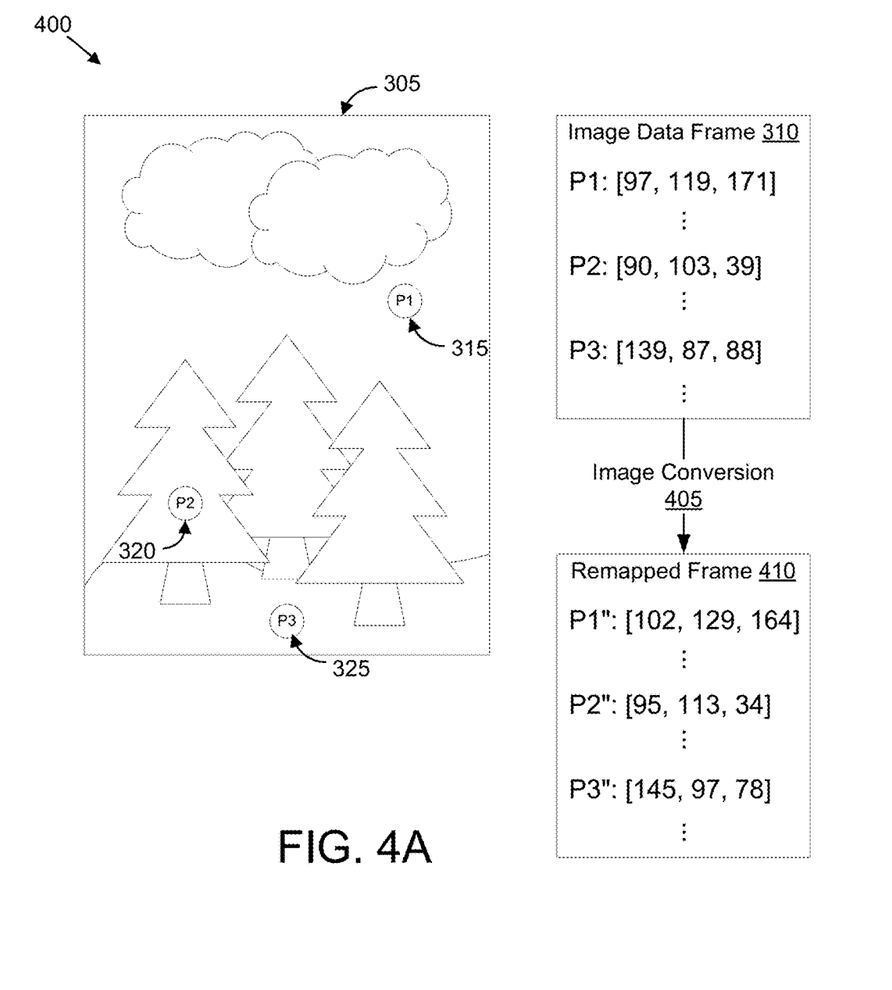
FIG. 4A is a schematic flow chart diagram illustrating second example of image adaptation.
Figure 4B:
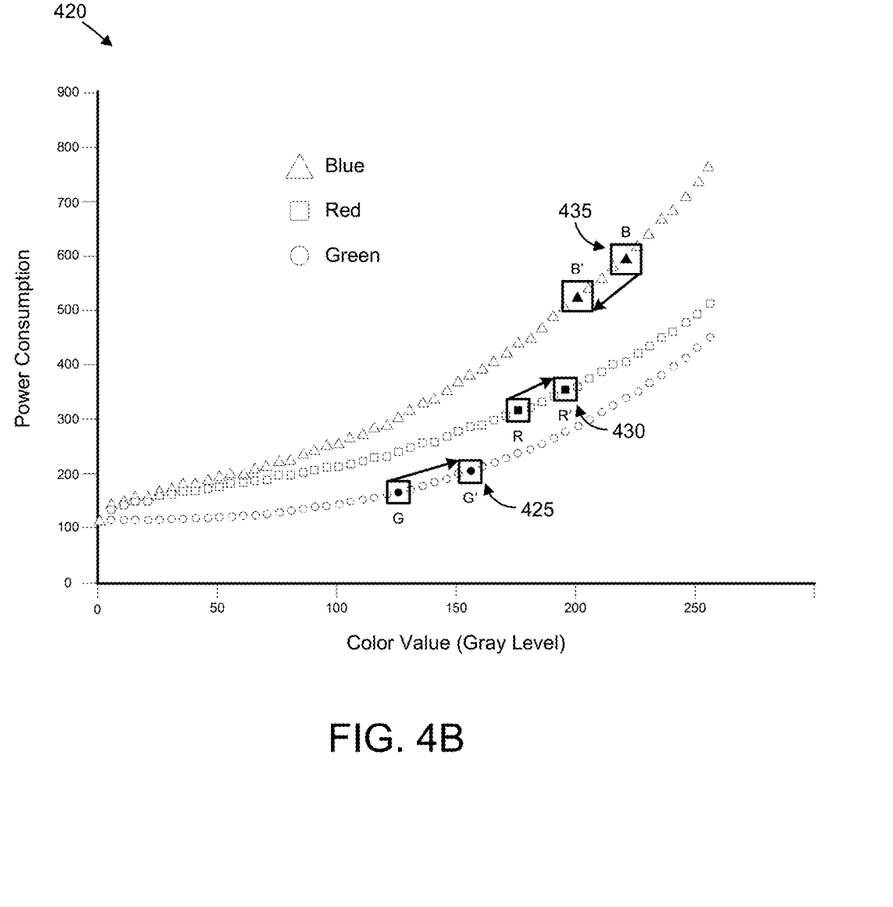
FIG. 4B is a schematic flow chart diagram illustrating another embodiment of a power consumption graph for different color values and power savings achieved by image adaptation.

FIGS. 4A-4B depict a second example of image adaptation according to the disclosed embodiments. FIG. 4A depicts a second image adaptation procedure 400 for the image 305, discussed above with reference to FIG. 3A. The image 305 corresponds to an image data frame 310. The image 305 and the image data frame 310 image comprise a plurality of pixels, including a first pixel 315, a second pixel 320, and a third pixel 325. Here, the pixels 315-325 from various parts of the image 305 and each corresponds to a different color.

As discussed above, the first pixel 315 has an RGB color value of [97, 119, 171], the second pixel 320 has an RGB color value of [90, 103, 39], and the third pixel 325 has an RGB color value of [139, 87, 88]. The second image adaptation procedure 400 includes converting 405 the image 305 by increasing the green color component by a predetermined amount, here by 10 gray levels. Each pixel in the image data frame 310 has its green color component increased by the same amount (10 gray levels).

Converting 405 the image data frame 310 also includes identifying a new (adjusted) white point value and remapping the red color component, on a pixel-by-pixel basis, by an amount determined by the new white point value and remapping the blue color component, on a pixel-by-pixel basis, by an amount determined by the new white point value. As depicted, the amount by which the red color component is adjusted differs from the amount by which the blue color component is adjusted. Further, the amount by which the blue color component is adjusted varies among the depicted pixels 315-325 in the image data frame 310.

Converting 405 the image data frame 310 produces a remapped frame 410. The remapped frame 410 comprises image data corresponding to an adaptation of the image 305. Here, the first pixel 315 is modified to a new RGB color value of [102, 129, 164]. The second pixel 320 is modified to a new RGB color value of [95, 113, 34]. The third pixel 325 is modified to a new RGB color value of [145, 97, 78]. Note here that the blue color component of the third pixel 325 is decreased by a maximum adjustment level equal to the predetermined amount by which the blue color component is reduced (e.g., 10 gray levels). In other embodiments, the maximum adjustment level may differ from the predetermined amount by which the blue color component is reduced.

FIG. 4B depicts a chart 420 of power consumption versus color value for blue subpixels, red subpixels, and green subpixels. As depicted, the blue subpixels consume more power at a given color value than either the red subpixels or the green subpixels, and the green subpixels consume less power at a given color value than either the red subpixels or the blue subpixels. The power savings of the second image adaptation procedure 400 is demonstrated using the chart 420. Here, a green subpixel 425 is first reduced by predetermined amount, then a red subpixel 430 is increased by an amount determined by the trust white point, and a blue subpixel 435 is decreased by an amount determined by the adjusted white point, as discussed above. Note that the decrease in power consumption by the blue subpixel 435 is greater than the sum of the increase in power consumption by the red subpixel 430 and the increase in power consumption by the green subpixel 425, therefore resulting in overall power savings compared to the original pixel. As this procedure repeats for each pixel in the image data frame 310, power savings is achieved throughout the remapped frame 410.

In certain embodiments, a given pixel of the image data frame 310 only undergoes image conversion 405 if a power savings will be realized by the transformation. A controller, such as the controller 205, may compare a blue color value for a pixel in the image data frame 310 and only adapt that pixel if the blue color values above the threshold amount. Otherwise, the remapped frame 410 may include the original RGB color value for the pixel.

Figure 5:
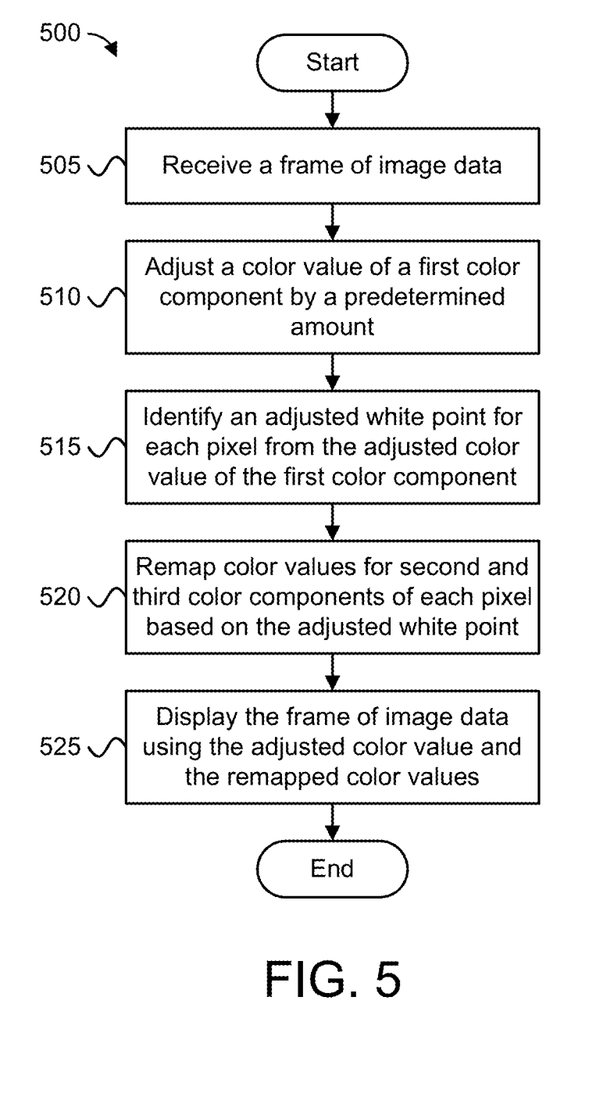
FIG. 5 is a schematic flow chart diagram illustrating another embodiment of method for adjusting color values in image data for an emissive display.

FIG. 5 illustrates a method 500 for adjusting color values in image data for an emissive display 110, according to embodiments of the disclosure. The method 500 performs image adaptation by intelligently adjusting a first color component by a predetermined amount, and then remapping the remaining color components based on a white point value. In some embodiments, the method 500 may be performed by the electronic device 105. In addition, the method 500 may be performed by a processor (e.g., the controller 205) and/or other semiconductor hardware embodied in the electronic device 105. In another example, the method 500 may be embodied as computer program code stored on computer readable storage media.

The method 500 begins and receives 505 a frame of image data. In some embodiments, receiving 505 the frame of image data includes analyzing the frame of image data to determine content types of image content within the frame of image data. For example, the frame of image data included dynamic image (e.g., video) or static image.

The method 500 further adjusts 510 a color value of a first color component by predetermined amount. In certain embodiments, the predetermined amount is based on whether the image content is a dynamic image or static image. For example, the predetermined amount may be greater for a dynamic image than for a static image. In some embodiments, adjusting 510 a color value of the first color component by predetermined amount occurs in response to receiving an image adaptation trigger. The image adaptation trigger may be one or more of: detecting that a device containing the display is running on battery power, detecting that the battery level is below threshold amount, detecting user selection of a power mode, and detecting that an on-pixel-ratio exceeds a predetermined threshold.

In one embodiment, adjusting 510 the color value the first color component comprises reducing the color value of the color component corresponding to a least efficient subpixel. In another embodiment, adjusting 510 the color value the first color component comprises increasing the color value of a color component corresponding to a most efficient subpixel. The method 500 may reduce the color value of the least efficient subpixel or increase the color value of the most efficient subpixel based on user preference, power savings requirements, image quality requirements, and the like.

The method 500 then identifies 515 a white point from the adjusted color value of the first color component for each pixel in the frame of image data. The white point may have a color temperature corresponding to the adjusted color value of the first color component. The method 500 remaps 520 color values for the second color component and the third color component based on the identified white point. Remapping 520 the color values for the second color component and the third color component occur on a pixel-by-pixel basis for each pixel in the frame of image data. Further, remapping 520 the color values comprises calculating an amount by which to adjust the second color component independently of calculating an amount by which to adjust the third color component.

The method 500 controls 525 an emissive display to present the frame of image data using the adjusted color value in the remapped color values. The method 500 ends. In some embodiments, the emissive display comprises a plurality of pixels, with each pixel of the emissive display containing a first subpixel that emits the first color component, a second subpixel that emits the second color component, and a third subpixel that emits a third color component. In certain embodiments, the pixels of the emissive display may include a fourth subpixel that emits a fourth color component.

Embodiments may be practiced in other specific forms. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An apparatus comprising:
   an emissive display comprising a plurality of pixels, each pixel of the emissive display comprising a first subpixel that emits a first color component, a second subpixel that emits a second color component, and a third subpixel that emits a third color component;
   a processor;
   a memory that stores code executable by the processor to:
   adjust, uniformly over a frame of image data, a color value of the first color component by a predetermined amount;
   identify a white point from the adjusted color value of the first color component for each pixel in the frame of image data;
   remap, for each pixel in the frame of image data, color values for the second color component and the third color component based on the white point; and
   control the emissive display to present the frame of image data using the adjusted color value and the remapped color values.

2. The apparatus of claim 1, wherein each pixel of the emissive display further comprises a fourth subpixel that emits a fourth color component, wherein remapping color values comprises the processor:
   calculating, for each pixel of the frame of image data, a revised color value for the second color component based on the white point;
   calculating, for each pixel of the frame of image data, a revised color value for the third color component based on the white point; and
   calculating, for each pixel of the frame of image data, a revised color value for the fourth color component based on the white point.

3. The apparatus of claim 2, wherein the remapped color values for each pixel are calculated independently of color values of other pixels in the frame of image data.

4. The apparatus of claim 1, wherein the processor further:
   receives an image adaptation trigger for remapping an image, wherein adjusting the color value of the first color component occurs in response to the image adaptation trigger.

5. The apparatus of claim 4, wherein the image adaptation trigger is selected from the group comprising: the apparatus running on battery power, a battery level dropping below a threshold amount, user selection of a power mode, and an on-pixel-ratio ("OPR") exceeding a predetermined threshold.

6. The apparatus of claim 1, wherein controlling the emissive display to present the frame of image data using the adjusted color value and the remapped color values comprises the emissive display presenting the frame of image data without reducing a display brightness level.

7. The apparatus of claim 1, wherein the processor further:
   determines whether the frame of image data comprises a dynamic image or a static image, wherein adjusting the color value of the first color component comprises adjusting the color value of the first color component by a first amount for a dynamic image and by a second amount for a static image, the first amount being greater than the second amount.

8. The apparatus of claim 1, wherein the first color component is a blue component, the second color component is a red component, and the third color component is a green component, wherein adjusting the color value of the first color component by a predetermined amount comprises reducing a blue value by the predetermined amount; and wherein remapping color values for the second color component based on the white point comprises increasing a red value based on the white point; and wherein remapping color values for the third color component based on the white point comprises increasing a green value based on the white point.

9. The apparatus of claim 1, wherein the first color component is a green component, the second color component is a red component, and the third color component is a blue component, wherein adjusting the color value of the first color component by a predetermined amount comprises increasing a green value by the predetermined amount; and wherein remapping color values for the second color component based on the white point comprises increasing a red value based on the white point; and wherein remapping color values for the third color component based on the white point comprises reducing a blue value based on the white point.

10. A method comprising:

receiving, at a processor, a frame of image data;

adjusting a color value of a first color component by a predetermined amount;

identifying a white point from the adjusted color value of the first color component for each pixel in the frame of image data;

remapping, for each pixel in the frame of image data, color values for a second color component and a third color component based on the white point; and controlling an emissive display to present the frame of image data using the adjusted color value and the remapped color values, the emissive display comprising a plurality of pixels, with each pixel of the emissive display containing a first subpixel that emits the first color component, a second subpixel that emits the second color component, and a third subpixel that emits the third color component.

11. The method of claim 10, wherein remapping color values comprises:

calculating, for each pixel of the frame of image data, a revised color value for the second color component based on the white point; and calculating, for each pixel of the emissive display, a revised color value for the third color component based on the white point.

12. The method of claim 11, wherein the revised color values for each pixel are calculated independently of color values of other pixels in the frame of image data.

13. The method of claim 10, wherein the first color component is a blue component and adjusting a color value of the first color component by a predetermined amount comprises reducing a grayscale value of the blue component of each pixel in the frame of image data by the predetermined amount.

14. The method of claim 10, wherein the first color component is a green component and adjusting a color value of the first color component by a predetermined amount comprises increasing a grayscale value of the green component of each pixel in the frame of image data by the predetermined amount.

15. The method of claim 10, further comprising:

receiving an image adaptation trigger for remapping an image, wherein adjusting the color value of the first color component occurs in response to the image adaptation trigger, wherein the image adaptation trigger is selected from the group comprising: detecting that a device containing the emissive display is running on battery power, detecting user selection of a power mode, and detecting that an on-pixel-ratio ("OPR") exceeds a predetermined threshold.

16. The method of claim 10, wherein controlling the display to present the frame of image data using the adjusted color value and the remapped color values comprises controlling the emissive display to present the frame of image data without reducing a display brightness level.

17. The method of claim 10, further comprising:

determining whether the frame of image data comprises a dynamic image or a static image, wherein adjusting the color value of the first color component comprises adjusting the color value of the first color component by a first amount for a dynamic image and by a second amount for a static image, the first amount being greater than the second amount.

18. A computer program product embodied on a non-transitory computer readable storage medium that stores code executable by a processor, the executable code comprising code to perform:

receiving a frame of image data;

adjusting, uniformly over the frame of image data, a color value of a first color component by a predetermined amount;

identifying a white point from the adjusted color value of the first color component for each pixel in the frame of image data;

remapping, for each pixel in the frame of image data, color values for a second color component and a third color component based on the white point; and controlling a display to present the frame of image data using the adjusted color value and the remapped color values, the display comprising a plurality of pixels with each pixel of the display containing a first subpixel that emits the first color component, a second subpixel that emits the second color component, and a third subpixel that emits the third color component.

19. The computer program product of claim 18, wherein the first color component is a blue component, the second color component is a red component, and the third color component is a green component, wherein adjusting the color value of the first color component by a predetermined amount comprises reducing a blue value by the predetermined amount; and wherein remapping color values for the second color component based on the white point comprises increasing a red value based on the white point; and wherein remapping color values for the third color component based on the white point comprises increasing a green value based on the white point.

20. The computer program product of claim 18, wherein the first color component is a green component, the second color component is a red component, and the third color component is a blue component, wherein adjusting the color value of the first color component by a predetermined amount comprises reducing a green value by the predetermined amount; and wherein remapping color values for the second color component based on the white point comprise increasing a red value based on the white point; and wherein remapping color values for the third color component based on the white point comprises reducing a blue value based on the white point.

* * * * *